(12) United States Patent
Sheehy

(10) Patent No.: US 6,319,538 B1
(45) Date of Patent: Nov. 20, 2001

(54) METHOD OF PRODUCING A CLAMSHELL SHAPED MEATBALL

(75) Inventor: Roger C. Sheehy, Goffstown, NH (US)

(73) Assignee: Jac Pac Foods, Ltd., Manchester, NH (US)

(*) Notice: Subject to any disclaimer, the term of this patent is extended or adjusted under 35 U.S.C. 154(b) by 0 days.

(21) Appl. No.: 09/237,441

(22) Filed: Jan. 26, 1999

(51) Int. Cl.[7] ..................................... A23L 1/317
(52) U.S. Cl. .......................... 426/646; 426/513; 426/516
(58) Field of Search .................................... 426/646, 513, 426/438, 510, 516

(56) References Cited

U.S. PATENT DOCUMENTS 3,713,187 * 1/1973 Quartarone et al. ................. 426/513
4,187,582 * 2/1980 DiLireto ........................... 426/516 X

OTHER PUBLICATIONS

Bridge Rotary Machine Co., *Bridge Titan Diaphragm*, all pages.

* cited by examiner

Primary Examiner—Arthur L. Corbin
(74) Attorney, Agent, or Firm—McAfee & Taft

(57) ABSTRACT

A method of forming clamshell shaped ground meat food article comprising the selective alignment of the meat fibers thereby producing a clamshell shape when cooked. The meat fibers are aligned through the extrusion of the ground meat through a closed channel to an aperture. The ground meat is briefly detained at the aperture while the aperture is closed resulting in a realignment of the fibers. The aperture is then opened allowing a predetermined amount of meat to pass through the diaphragm, upon which the diaphragm is closed to sever the predetermined amount. The severed portion is then cooked whereby the contraction of muscle fibers form the desired shape.

12 Claims, 3 Drawing Sheets

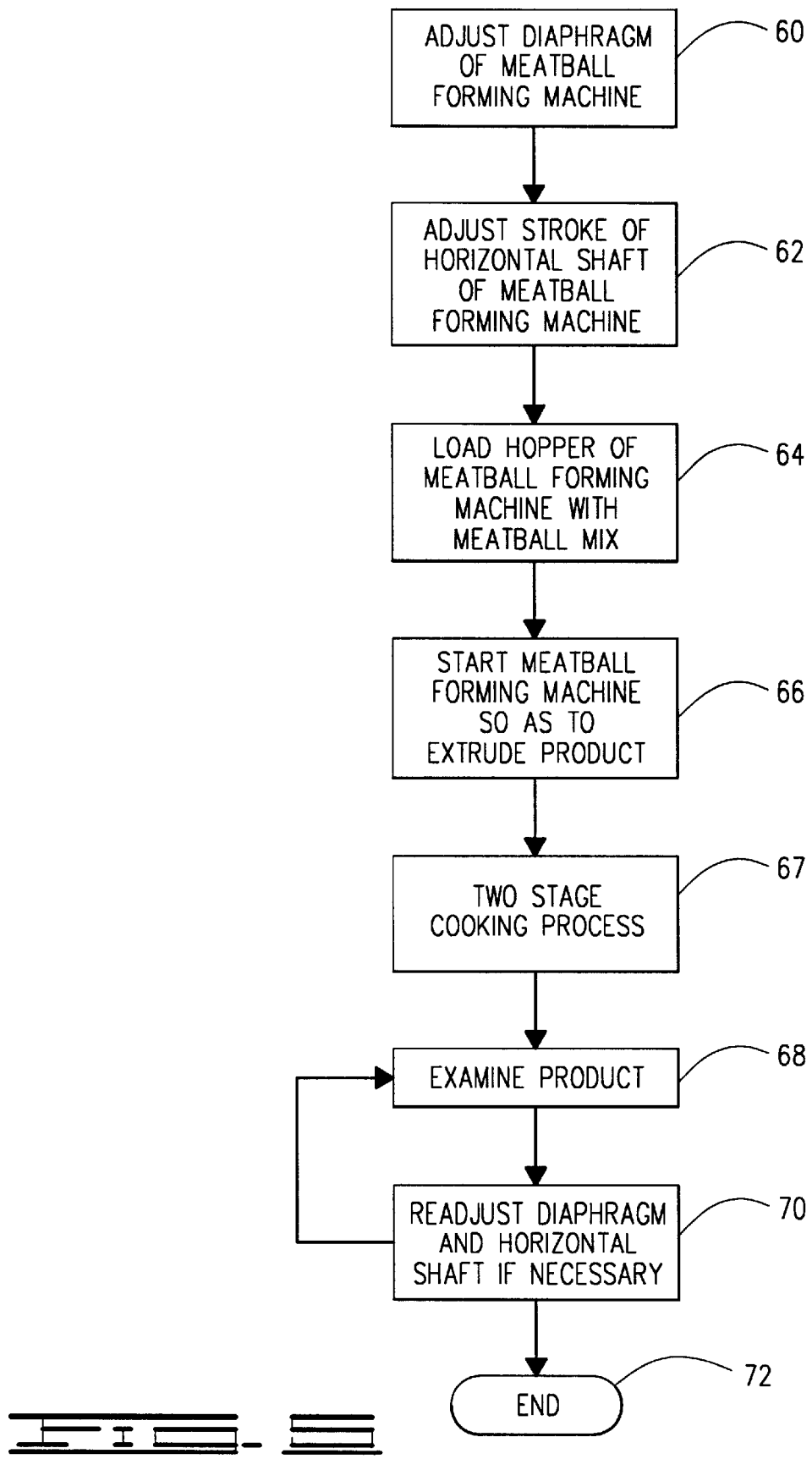

METHOD OF PRODUCING A CLAMSHELL SHAPED MEATBALL

FIELD OF THE INVENTION

The present invention relates to the field of portioning a food product, and more particularly, to a process of producing a flat or clamshell shaped food product.

BACKGROUND OF THE INVENTION

In the food preparation industry the visual appearance of a food is often dictated by the consistency of the food itself. For example, if the food is rigid or frangible it will not lend itself to being formed into other shapes; on the other hand, if the food is gelatinous, it may be freely molded into attractive or useful shapes for presentation puposes. Ground beef is one such food product that has been traditionally formed into shapes like flat patties, such as hamburgers, or spheres, such as meatballs.

As is well known, meatballs are round. Webster's dictionary defines meatball as "a small ball of chopped or ground meat often mixed with bread crumbs and spices." Webster's dictionary also defines ball as "a round or roundish body or mass; a spherical or ovoid body used in a game or sport." One problem immediately apparent to the spherical shaped food article is its propensity to roll away from the preparer or consumer. Because the spherical article may roll with little applied force, it is subject to spillage and product loss during preparation and consumption.

As is well known, the current commercial production of meatballs involves a process of forming a round uncooked meatball, with a uniform weight and diameter, and finally into a cooked round meatball. The uncooked ball is typically cooked at a particular temperature, then frozen for shipment to various distributors and commercial establishments.

As is also well known, meatballs are typically used in a variety of food products such as pasta dishes and grinders, hero or submarine sandwiches. As is known, when utilizing the traditional "round" meatball, there is a tendency for the finished sandwich to allow the meatball, when being prepared or consumed, to fall out of the sandwich. Thus, it is quite common for the end retailer to slice the meatball in half in order to prevent the spillage or "rolling out" of the meatball from the finished food product. Also, a meatball sandwich made with the traditional round meatballs tends to have a higher profile and can be difficult to eat because it does not fit easily into the consumer's mouth. For this reason, the meatball sandwich is not a desirable sandwich for some people.

One problem encountered in the food preparation art especially in the context of a fast food restaurant, is that the slicing of a spherical product, such as a meatball, may result in injury to the preparer. The labor saved in not splitting the meatball results in both a cost savings in labor and faster customer service.

What is needed is an economical method of continuously producing a low profile meatball that will resist slippage and fit easily into a consumers mouth

SUMMARY OF THE INVENTION

In accordance with the principles of the present invention a method of producing clamshell shaped food product is presented. For the purposes of this application, a clamshell shape is a solid which is substantially shaped like a clamshell meaning its shape resembles that of an airfoil or teardrop when viewed from the side, and is substantially round when viewed from above. The method of the present invention comprises extruding a stream of a moldable food material, such as ground meat, through the open aperture of an iris diaphragm. The aperture is then closed on the extrusion stream to sever a predetermined portion of the food product. The result is a round or spherically shaped food product, which when cooked, will contract into the flatter clamshell shape of the invention.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

FIG. 5 is a flow diagram illustrating the process of forming a clamshell shaped meatball in accordance with the principles of the present invention.

DETAILED DESCRIPTION OF THE PREFERRED EMBODIMENT(S)

Figure 1:
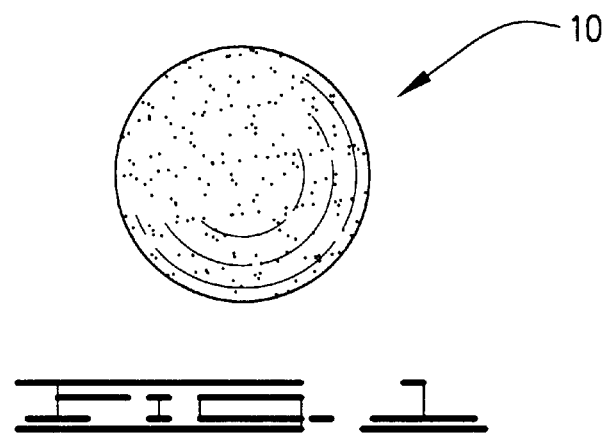
FIG. 1 is a side view of an exemplary traditional meatball in a traditional round shape.

Referring to FIG. 1, an exemplary traditional meatball 10 is shown as a generally spherical product. Past processes used to produce the traditional meatball 10 have been designed with the goal of producing a uniform and round meatball product.

Figure 2:
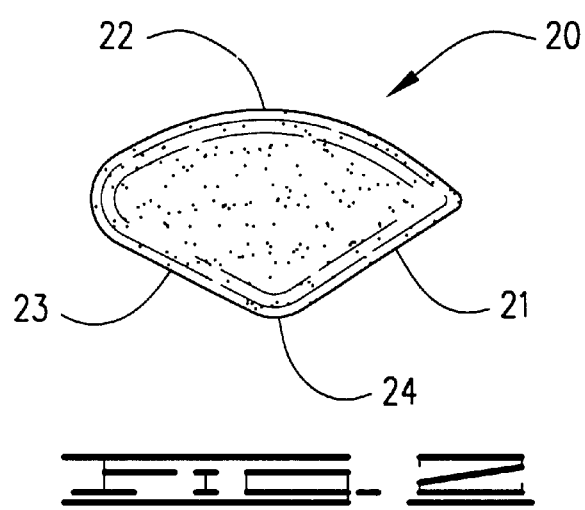
FIG. 2 is a side view of an exemplary clamshell meatball produced in accordance with the principles of the present invention.

Referring to FIG. 2, a side view of a clamshell shaped meatball 20 prepared by utilizing the principles of the present invention is shown. The side view of the clamshell shaped meatball 20 of FIG. 2 illustrates an airfoil or teardrop shape of the present invention, wherein an upper hemisphere 22 of the clamshell shaped meatball 20 is rounded in a continuous curve of generally uniform character. A lower hemisphere 24 of the clamshell shaped meatball 20 contains a rounded portion 23 and a flat portion 21. The flat portion 21 prevents slippage, and allows the meatball to be incorporated into other food products, such as sandwiches, without slipping out of the product, for example, meatballs, that will not "roll out" of the bread in a submarine sandwich.

The composition of the food product (not shown) used to make the clamshell shaped meatball 20 is preferably a ground meat mixture. Most preferably the food product is a meatball mixture. The composition of the meatball mixture (not shown) varies substantially in the art, but generally contains a ground meat or a mixture of ground meats, a bread filling and a combination of various spices. Any food product whose physical characteristics are similar to ground meat may be used in the practice of the present invention. Specifically, the food product must be moldable and contract when cooked. Meats that are especially suitable for the present invention include ground chicken, turkey, lamb, veal, pork and any combination thereof.

The phenomena that animal muscle fiber, whether in whole meats or ground meats, contracts when cooked is well known in the art. Traditionally makers of round meatballs 10 who utilize a continuous meatball forming machine 30 of FIG. 4, have shaped their pre-cooked meatballs as ellipsoids with the intention that the meat would contract longitudinally when cooked, forming a spherical shape in the final product. The present invention alters this principle by selectively arranging the muscle fibers such that the shaped food portion produces the desired clamshell shape.

Figure 3:
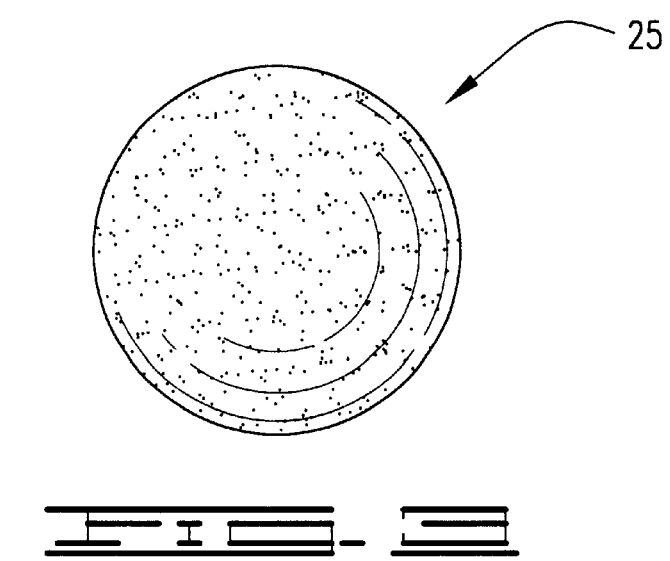
FIG. 3 is a top view of an exemplary clamshell meatball produced in accordance with the principles of the present invention.

Referring to FIG. 3, a top view of the clamshell shaped meatball 25 is presented showing the generally round shape.

Figure 4:
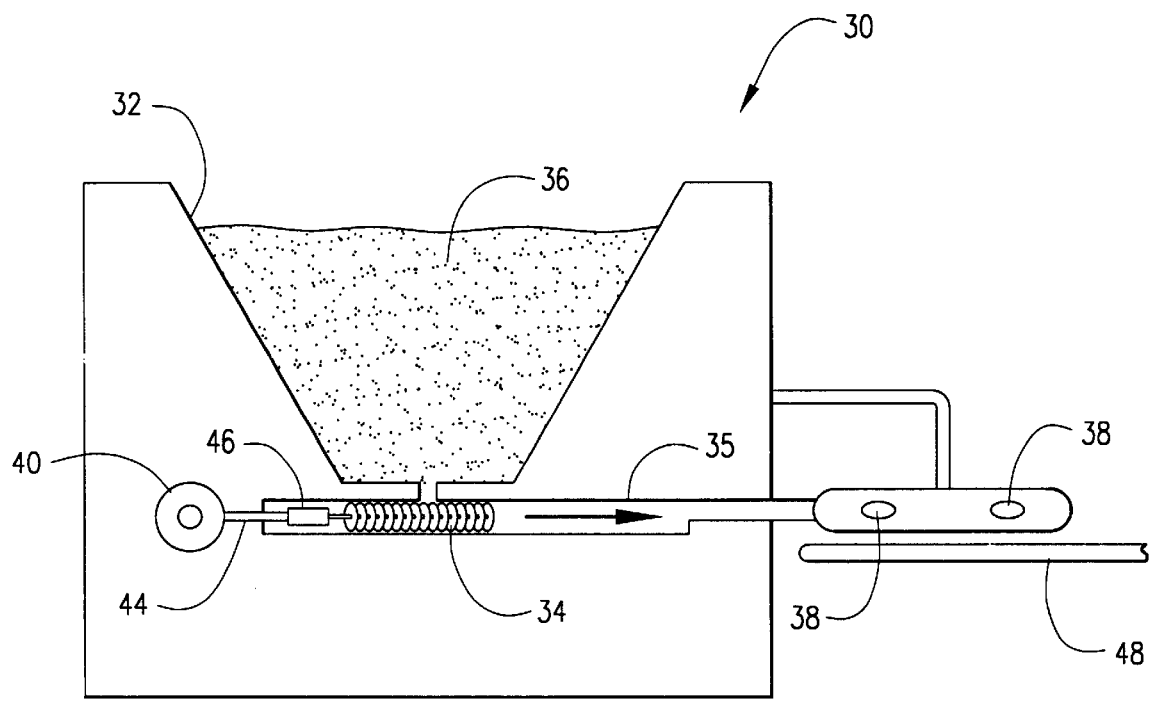
FIG. 4 is an exemplary meatball forming machine that may be utilized for the processing of producing clamshell meatballs in accordance with the principles of the present invention.

Referring to FIG. 4, an exemplary meatball forming machine 30 is shown in cross section. Although any suitable meatball forming machine may be adapted to the current method of producing a clamshell shaped meatball 20 (of FIG. 2), it is preferred that the meatball forming machine 30 is a Bridge-Titan Meatball Former produced by Bridge Rotary Machine Company of Palmyra, N.J. The meatball forming machine 30 consists of a hopper 32 in which a rotating feed screw 34 extrudes a product mix 36, against a dosage mouthpiece (also known as an iris diaphragm or diaphragm) 38 which works on the same principle as an iris diaphragm of a camera. The size of the aperture or opening of the diaphragm 38 determines the diameter and shape of the finished product (not shown).

The machine 30 is operated by an electric motor (not shown). This motor drives via a variable speed pulley adjustment 40, a horizontal shaft 44 and a coupling 46, which drives the feed screw 34 located within the feed tube 35. At the same time the variable speed pulley 40 regulates, by means of a separate mechanism (not shown), the working of the diaphragm 38. The transport-speed of the product mix 36, necessary for the required size of the finished product (not shown), can be regulated by means of the rod and coupling 46. The output (i.e., finished product) can also be regulated by means of the variable speed pulley adjustment 40. In general, the larger the diameter of the finished product, the lower the speed of the pully 40 has to be adjusted. If the transport-speed of the finished product and the variable speed pulley adjustment 40 are synchronized then an ellipsoidal pre-cooked meatball is produced which when cooked forms the familiar spherical shape.

In the process of the present invention, the transport-speed of the product mix 36 and the output which is regulated by means of the variable speed pulley adjustment 40 are intentionally set as being out of synchronization such that the diaphragm 38 is closed when product mix 36 is forced against it.

The product mix 36 is extruded in a continuous extrusion stream from the hopper 32, through the feed tube 35, to the diaphragm 38. The orientation of the muscle fiber in the hopper 32 is random and as is well known, a meatball formed from randomly aligned meat fibers contracts uniformly in all directions. However, in the present invention, it has been found that when muscle fiber is extruded through a pipe or closed channel, such as feed tube 35, the fibers uniformly align themselves in the direction of the product flow. As the extrusion stream is forced up against the closed diaphragm 38, the muscle fibers which were formerly aligned in the direction of flow, are crushed up against the diaphragm 38 and align themselves obliquely to the direction of flow. The diaphragm 38 which is initially closed as the extrusion stream is forced up against it, is slowly opened forcing a portion of the extrusion stream through the diaphragm 38.

The first portion of the product through the diaphragm 38 is lower hemisphere 24 of the meatball. The last portion of the product through the aperture is the upper hemisphere 22. Because the upper hemisphere 22 does not experience the force of the extrusion stream compressing it against the diaphragm 38, the muscle fibers in the upper hemisphere 22 are substantially aligned in the direction of flow of the extrusion stream. As a predetermined portion of the meat product passes through the diaphragm 38, the diaphragm 38 is closed, severing the meatball from the extrusion stream. The result is a pre-cooked, spherical meatball. Because the muscle fibers in the lower hemisphere 24 and upper hemisphere 22 are arranged in different directions, the contraction of the meatball during cooking will be asymmetrical producing the desired clamshell shape. It is preferred that the cooking process be a two-step procedure, the first step is a frying or "crusting" step in which the meatball is subjected to high heat for a brief period of time. This frying step cooks the outside layer of the meatball thoroughly forming a crust layer sealing in the meatballs natural moisture. The second step of the cooking process is the steaming step whereby the uncooked inside of the meatball is cooked by exposure of the crusted meatball to steam for a sufficient period to cook the meatball through.

Referring to FIG. 5, a flow diagram of the current process in which an exemplary meatball mix is utilized according to the principals of the present is shown to begin at step 60 in which an adjustment to the diaphragm of the meatball forming machine is made. At step 62 an adjustment is made to the stroke of the horizontal shaft of the meatball forming machine.

At step 64 the hopper of the meatball forming machine is charged with meatball mix. At step 66 the meatball forming machine is started so as to extrude product through the diaphragm of the unit. At step 67 the individual meatballs are cooked. Preferably, the cooking process is a two step process entailing a frying or crusting step and as well as a steaming step. At step 68 initial product is analyzed to determine whether the adjustments to the stroke of the horizontal shaft and the diaphragm of the meatball forming machine is proper so as to produce a clamshell shaped meatball. If at step 68 it is found that the initial product is not clamshell shaped then at step 70 the diaphragm of the meatball forming machine and the stroke of the horizontal shaft of the meatball forming machine are adjusted further out of synchronization so as to produce a clamshell shaped meatball. The process ends at step 72.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method of forming a clamshell shaped food product from a meat mixture containing animal muscle fiber comprising:
   forming a sphere with an upper hemisphere and a lower hemisphere;
   aligning the fibers of the upper hemisphere axially;
   aligning the fibers of the lower hemisphere obliquely to the axis so that the lower hemisphere contains a round portion and a flat portion; and
   cooking the sphere.

2. The method of forming a clamshell shaped food product according to claim 1, wherein the meat mixture is a ground meat product.

3. The method of forming a clamshell shaped food product according to claim 2, wherein the meat mixture is a meatball mixture.

4. The method of forming a clamshell shaped food product according to claim 1, wherein the cooking is a frying process.

5. The method of forming a clamshell shaped food product according to claim 1, wherein the cooking is a steaming process.

6. The method of forming a clamshell shaped food product according to claim 1, wherein the cooking is both frying and steaming.

7. The method of forming a clamshell shaped food product according to claim 1 wherein the meat mixture is selected from a group consisting essentially of pork, beef, and poultry.

8. The method of forming the clamshell shaped food product of claim 7, wherein the meat mixture is a ground meat.

9. The method of forming the clamshell shaped food product of claim 7, wherein the meat mixture is made of both beef and pork.

10. The method of forming the clamshell shaped food product of claim 7, wherein the meat mixture comprises both poultry and beef.

11. The method of forming the clamshell shaped food product of claim 7, wherein the meat mixture comprises both poultry and pork.

12. The method of forming the clamshell shaped food product of claim 7, wherein the meat mixture comprises pork, poultry and beef.

* * * * *